July 4, 1933.  W. W. HINES  1,917,117
BANDAGE FOR THE EYES
Filed Oct. 3, 1931
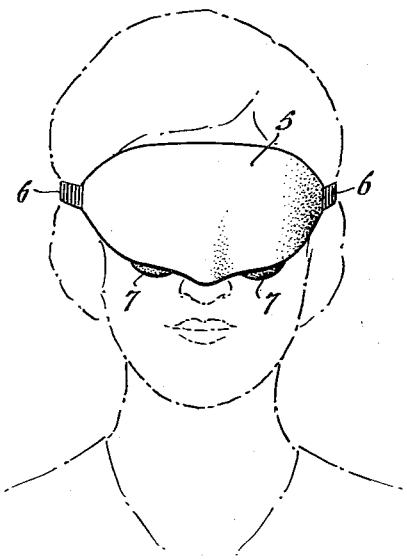
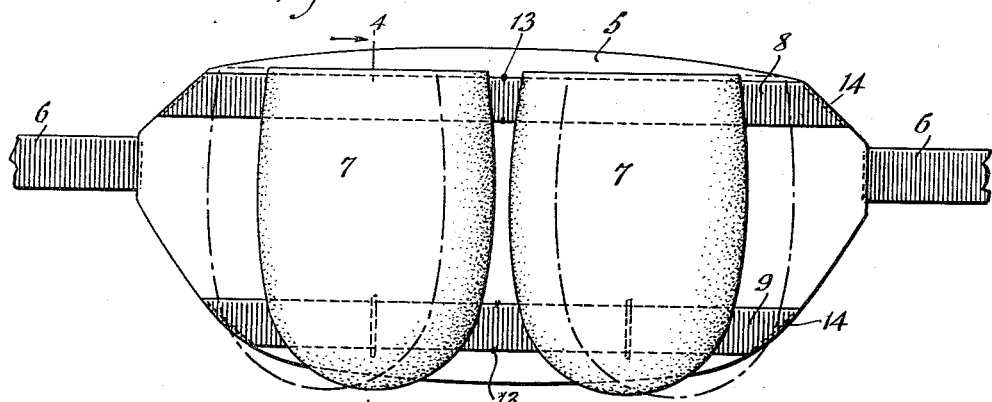
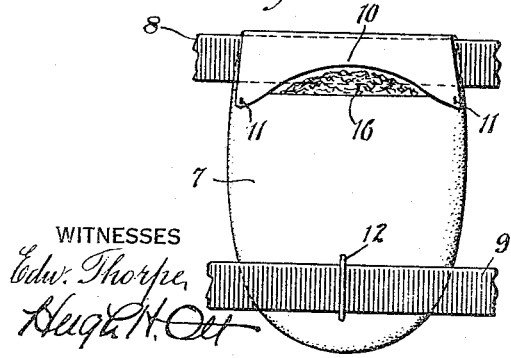

Patented July 4, 1933

1,917,117

UNITED STATES PATENT OFFICE

WILLIAM W. HINES, OF NEW YORK, N. Y.

BANDAGE FOR THE EYES

Application filed October 3, 1931. Serial No. 566,723.

This invention relates to devices for excluding light from the eyes and comprehends a device of this character which, while it may be used for any purpose where a complete and effectual exclusion of light is desired, finds its principle application as a means for aiding in obtaining relaxation while sleeping in the presence of light, by relieving the user of sub-conscious muscular strain, which causes wrinkling, headaches, and other such undesirable and detrimental effects.

While devices of this character, and for this and other purposes, have been previously devised, they have all failed to fully and effectually perform the function of completely excluding the light from the eyes, and this may be mainly attributed to the failure to compensate for the wide variation which exists in the facial contour of different persons, such as the variance in the depth of the depressions of the orbital regions which have been found to differ in every person, and furthermore, due to the difference in the pupilary distance or spacing of the orbital recessions.

In recognition of these differences and in order to overcome the faults extant in such devices, the present invention comprehends in an improved device or bandage of the indicated character, pads or equivalent means which are so constructed as to intimately contact with and completely fill the recessions of the orbital regions of the face, thereby insuring a complete and effectual exclusion of light from the eyes when the bandage is properly applied.

The invention further resides in the employment of pads which are more particularly in the nature of pockets into each of which a soft padding or filling material is introduced until they are individually provided with the quantity of padding or filling necessary to insure the intimate contact required in each instance.

The invention further contemplates means for comfortably supporting the pads or elements, and effecting inward pressure of the same into effective contact with the orbits or orbital regions, which means is in the nature of a band adapted to encircle the head, and which is adjustable to coincide with the head size.

As a further feature, the invention embraces means for associating the pads with the supporting band so as to permit adjustment of the pads to properly coincide with the pupilary distance or spacing of the orbital recessions of the face.

Other objects obtained by the invention are the comparative simplicity of construction of the device, as well as its mode of use of application, the economy with which it may be produced, and the general efficiency derived therefrom.

With the above recited and other objects in view, reference is made to the following specification and the accompanying drawing, in which there has been illustrated a single and preferred embodiment of the invention, while the claims define the actual scope thereof.

In the drawing:

Figure 1 is a front view of the bandage in its applied position.

Figure 2 is a fragmentary rear view thereof illustrating in full and broken lines several positions of the pads.

Figure 3 is a fragmentary sectional view taken approximately on the plane indicated by the line 3—3 in Figure 4.

Figure 4 is a cross sectional view of the bandage taken approximately on the line indicated at 4—4 in Figure 2 and showing in full and in broken lines the manner in which the thickness of the pad is increased.

Referring to the drawing by characters of reference, the bandage includes a supporting member which is preferably composed of a mask portion or part 5, which is of a width to extend from the forehead above the eyebrows to a point below the cheeks and above the tip of the nose, and which is of a length to extend from one temple to the other. The supporting member is completed by a strip or strips 6 secured thereto, or formed integral therewith, and extending from the opposite ends of the mask portion or part 5, and of a size to snugly fit around the head and to exert by circumferential contraction an inward pressure of the mask portion or part 5.

Obviously, the strip or strips 6 may be provided with any suitable means for circumferentially adjusting the same to the head size of the wearer.

The bandage or device further includes a pair of pads 7, one of which is adapted to fit within the orbital depression of one eye, and the other of which is adapted to fit within the orbital depression of the other eye. This orbital depression or recession is that region of the face defined between the cheek, eyebrow and nose, and obviously, in different persons, these depressions or recessions vary both as to their spacing and depth. In order, therefore, to compensate for the relative spacing of the orbital depressions or recessions, the pads or elements 7 are suitably mounted on the inner side of the mask portion or part 5 of the bandage for lateral relative adjustment with respect to each other and with respect to the mask portion or part 5, as clearly indicated in the full and broken lines in Figure 2 of the drawing. As particularly disclosed, the rear side of the mask portion or part 5 is provided with a pair of vertically spaced parallel longitudinally extending supporting strips or tapes 8 and 9. The upper edge of each pad is folded over the upper strip or tape 8 to provide a flap 10, the corners of which are tacked or secured in any desired manner, as at 11, to the body of the pad to afford a means for slidably connecting the upper end of the pad 7 with the strip or tape 8. The lower rear portion of each pad is provided with a loop or equivalent means 12 which engages over and freely receives the lower strip or tape 9. Preferably, the tapes or strips 8 and 9 are centrally secured by tacking or stitching the medial portions thereof, as at 13, to the center of the mask portion or part 5, while the outer free ends thereof are stitched or otherwise secured, as at 14, to said portion or part.

The pads or elements 7 are constructed in such a form as to define pockets 15 which are normally closed at their upper ends by the flaps 10, but to which access may be gained by lifting the medial portion of the flaps. These pockets are designed to receive a suitable soft padding or filling material 16 which padding material is designed to impart the necessary bulk to the pads 7 to insure an intimate and complete contact of the pads with the region of the face surrounding the eyes, and to fill the orbital recessions or depressions for the purpose of effectually excluding the light therefrom. In Figure 4, there is illustrated in full and broken lines a difference in the thickness of a pad to compensate for variance in the depth of the orbital recession.

From the foregoing, it will be seen that a bandage has been devised which when properly adjusted affords means for completely excluding light from the eyes so that complete relaxation may be obtained while sleeping in the presence of light. The bandage is so constructed and designed so as not to interfere with breathing, and obviously, with the bandage applied, it is unnecessary to interfere with the ventilation of a room by interposing screens, shades, shutters, or other similar ventilation interfering devices of this nature over the windows or doors.

While there has been illustrated and described a preferred embodiment of the invention, it is to be understood that no limitation is intended to the precise structure details, and variations and modifications thereof which fall within the scope of the claims may be resorted to when desired.

What is claimed is:

1. A bandage for the eyes including a pad for each eye, each pad having a body fashioned to provide a pocket having a mouth for the reception of a quantity of padding material essential to cause the pads to fill the orbital recession to which it is applied and a head encircling member supporting the pads and means connecting the pads with the supporting member for independent lateral adjustment relative thereto so as to coincide with the spacing of the orbital recessions, said means including a transverse strip on the inner side of the member and loops formed on said pads.

2. A bandage for the eyes including a pad for each eye, each pad having a body fashioned to provide a pocket having a mouth for the reception of a quantity of padding material essential to cause the pads to fill the orbital recession to which it is applied, a folded flap normally covering the pocket mouth, a head encircling member supporting the pads and a transverse strip on the inner side of the supporting member over which the folded pad flaps engage to connect the pads with the member for independent transverse adjustment to coincide with the spacing of the orbital recessions.

WILLIAM W. HINES.